(12) United States Patent
Hoffman

(10) Patent No.: US 6,829,878 B1
(45) Date of Patent: Dec. 14, 2004

(54) QUICK CHANGE DISC KNIFE MOUNTING MECHANISM

(75) Inventor: Charles H. Hoffman, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/812,178

(22) Filed: Mar. 29, 2004

(51) Int. Cl.[7] ............................................ A01D 55/18
(52) U.S. Cl. ...................................................... 56/295
(58) Field of Search ............................. 56/12.7, 12.1, 56/17.5, 255, 295, 13.6, 192, DIG. 17, DIG. 20; 30/276, 275.4

(56) References Cited

U.S. PATENT DOCUMENTS

| | | | |
|---|---|---|---|
| 3,604,189 A | 9/1971 | Harer et al. | 56/295 |
| 3,662,529 A | 5/1972 | Glunk et al. | 56/295 |
| 3,958,402 A | 5/1976 | Bouet | 56/295 |
| 4,227,365 A | 10/1980 | van der Lely et al. | 56/13.6 |
| 4,313,297 A | 2/1982 | Maier | 56/295 |
| 4,525,990 A | 7/1985 | Zweegers | 56/295 |
| 5,271,212 A * | 12/1993 | Anderson | 56/12.7 |
| 5,502,958 A | 4/1996 | Plamper | 56/17.5 |
| 5,622,035 A * | 4/1997 | Kondo et al. | 56/12.7 |
| 5,839,263 A | 11/1998 | Biernath et al. | 56/255 |

* cited by examiner

Primary Examiner—Robert E Pezzuto
(74) Attorney, Agent, or Firm—John William Stader; Collin A. Webb

(57) ABSTRACT

A rotary disc cutterhead knife mounting system uses a spring plate bolted to the underside of the cutterhead cover. A knife pin is attached also to the underside of the cover, adjacent the outer edge thereof, and extends downwardly therefrom. The knife has a mounting hole therethrough, slightly larger that the diameter of the knife pin. With the knife hole fitted on the knife pin, the spring plate compresses the knife toward the underside of the cover; holding the knife in operating position. A special tool is used to remove the knife by forcing the spring plate downward, freeing the knife.

15 Claims, 3 Drawing Sheets

QUICK CHANGE DISC KNIFE MOUNTING MECHANISM

BACKGROUND OF THE INVENTION

The present invention relates generally to an improved agricultural disc mower, and particularly to an improved cutterhead for a disc mower that permits quick and easy replacement of the knife without the necessity of removing and installing nuts and bolts.

For several years agricultural and most roadside mowing, whether by itself or as one step in a crop treatment process, has been changing from the older sickle mowers to disc mowers. Typical disc cutterbars include an elongated housing containing a train of meshed idler and drive spur gears, or a main power shaft coupled by respective bevel gear sets, for delivering power to respective drive shafts for cutterheads spaced along the length of the cutterbar. The cutterheads each comprise a cutting disc including diametrically opposed cutting blades and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. In either case, bearings are used to support the various shafts. The cutterheads are rotated at a relatively fast speed making durability a necessary characteristic of all components. For background information on the structure and operation of some typical disc cutterbars, reference is made to U.S. Pat. No. 4,815,262, issued to E. E. Koch and F. F. Voler, the descriptive portions thereof being incorporated herein in full by reference.

Operators and maintenance personnel are required, from time to time, to remove and replace a knife or knives on disc cutterbars. This process typically requires the removal of nuts, bolts, washers, spacers and other miscellaneous hardware in a difficult working environment. The parts of the cutterhead are usually covered with crop chaff and dirt, and the entire machine is often in a hot field with bugs. It would be very helpful to provide these personnel with a simpler knife-holding arrangement that can be changed with minimum effort and time.

SUMMARY OF THE INVENTION

Accordingly, it is an object of the present invention overcome the problems identified above.

It is another object of the present invention to provide a quick change system for the knives of a disc cutterhead.

Another object of the present invention is to provide a disc cutterhead that requires no wrenches to replace the knives.

It is another object of the instant invention to provide a knife mounting system for a rotary cutterhead that employs a spring mechanism to hold the knife blade in position for ease of replacement.

It is still another object of the instant invention to provide a knife mounting system for a rotary cutterhead that uses a spring plate bolted to an upper mount, the spring plate and upper mount clamped together by way of a knife bolt. Thus, the knife is held securely between the spring plate and the upper mount.

It is yet another object of this invention to provide a tool to loosen the knife by forcing the spring plate down to free the knife.

It is a still further object of this invention to provide a quick change disc knife mounting mechanism and tool that is durable in construction, inexpensive of manufacture, carefree of maintenance, facile in assemblage, and simple, versatile and effective in use.

These and other objects are attained by providing a rotary disc cutterhead knife mounting system that uses a spring plate bolted to the underside of the cutterhead cover. A knife pin is attached also to the underside of the cover, adjacent the outer edge thereof, and extends downwardly therefrom. The knife has a mounting hole therethrough, slightly larger that the diameter of the knife pin. With the knife hole fitted on the knife pin, the spring plate compresses the knife toward the underside of the cover; holding the knife in operating position. A special tool is used to remove the knife by forcing the spring plate downward, freeing the knife.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
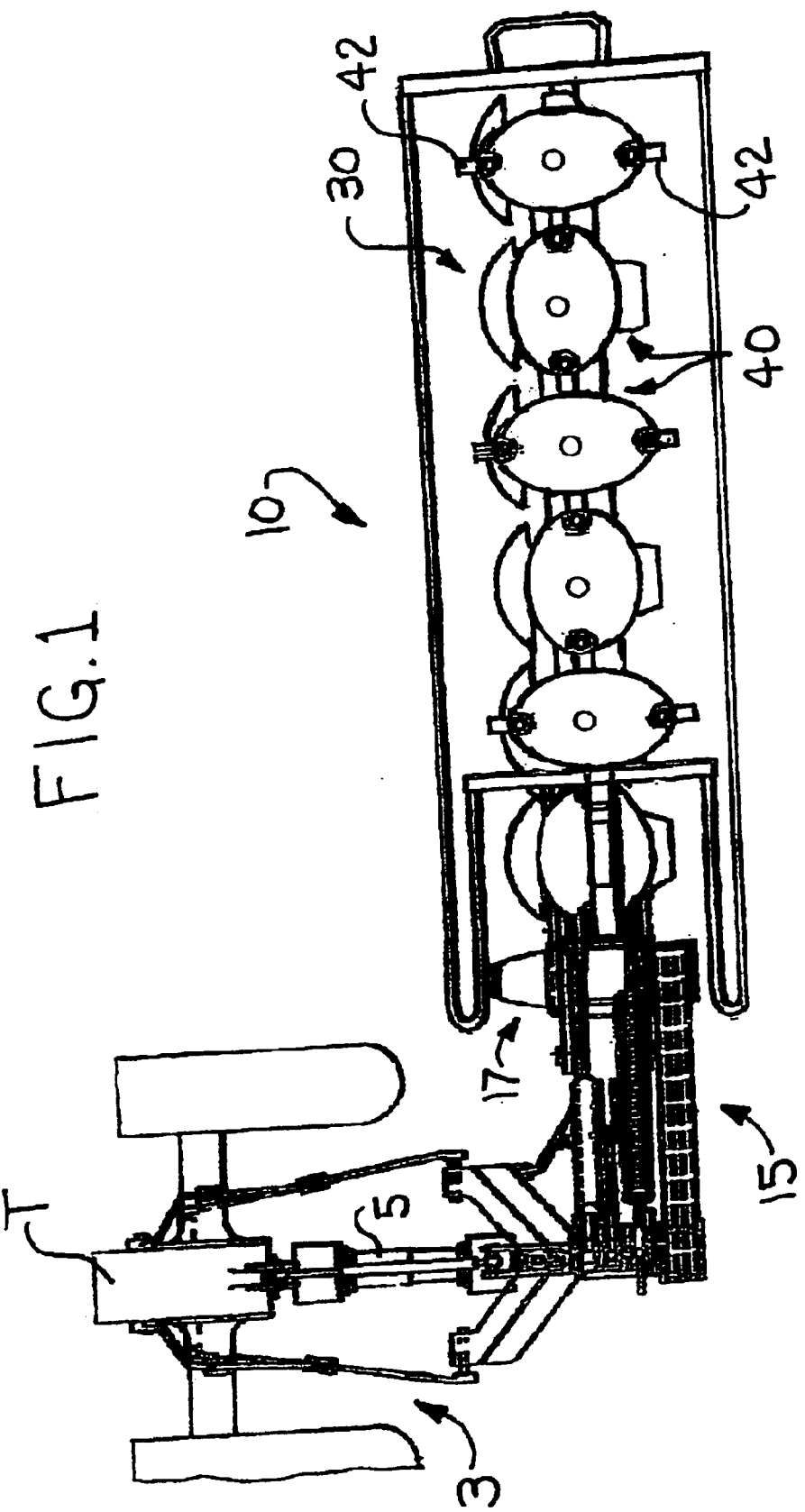
FIG. 1 is a top elevational view of a rotary disc mower of the type with which the invention may be used.

Referring now to the drawings and particularly to FIG. 1, a modular disc cutterbar incorporating the principles of the instant invention can best be seen in a configuration in which the disc cutterbar is conventionally utilized. For a more detailed description of a conventional modular disc cutterbar and various configurations thereof reference is made to U.S. Pat. No. 5,996,323. The disclosure in that patent is hereby incorporated herein in its entirety by reference.

Cutterbar 30 is mounted in a disc mower 10 having a support frame 11 connected to the three-point hitch mechanism 3 of a tractor T on which the mower 10 is carried in a conventional manner. The disc mower 10 receives operative power from the conventional tractor power take-off shaft 5.

The mower drive mechanism 15 receives the rotational power from shaft 5 and transfers the rotational power to a gearbox 17, which in turn transfers the rotational power to the cutterbar drive mechanism.

An alternative configuration for the disc cutterbar would be to incorporate the cutterbar in a disc mower-conditioner. This well-known configuration is shown in more detail in U.S. Pat. No. 5,761,890, which is hereby incorporated herein in its entirety by reference. One skilled in the art and knowledgeable about commercial applications of disc cutterbars will readily recognize that there are other specific configurations of cutterbars to which the invention to be disclosed herein will be applicable. Such skilled individual will also readily recognize that the cutterbar need not necessarily be modular in construction.

Modular cutterbar 30 is formed from alternating cutterhead modules 40 and spacer modules. Each cutterhead module 40 includes a hollow cast housing having a shape to retain a low profile and to establish an oil reservoir therewithin. The cutterheads 40 are gear driven and assembled in such a manner as to establish a specific timing relationship between adjacent units. More particularly, the cutterheads are arranged such that the knives 42 on adjacent units have overlapping cutting paths, but do not come into contact with each other. Failure to maintain this timed relationship during operation will result in one unit hitting the adjacent unit(s), damaging the cutterheads (and possibly initiating a chain reaction that damages all cutterheads), the drive train of the cutterbar and/or tractor T. In such case, the damage is usually significant.

Figure 2:
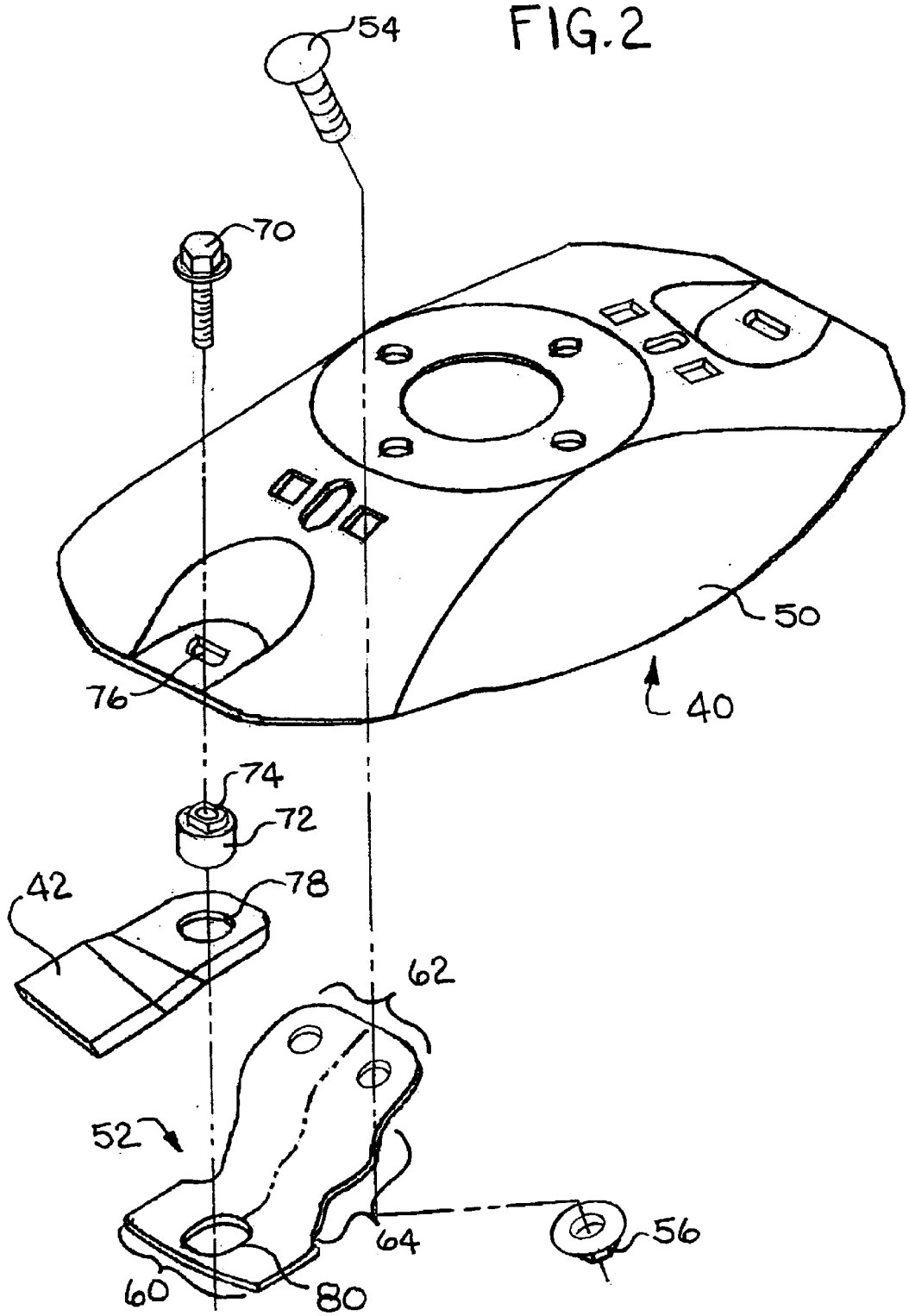
FIG. 2 is an exploded perspective view of the knife mounting system of the instant invention.

FIG. 2 shows the present invention utilized in connection with a rotating cover, or "turtle", 50 that partially encloses some of the drive components of the cutterhead module 40 and serves as a platform for knives 42. In operation, cover 50 is rotated about a vertical axis by the cutterbar drive system, causing knives 42 to rotate about that axis to engage and cut the standing crop material. The cover shown supports to opposing knives; however, three or more may be used so long as the components are arranged for a balanced rotation. Furthermore, each knife is mounted to the cover such that the knife can itself freely rotate relative to the cover. This permits the knife to move out of its normal path when an obstruction is engaged.

Figure 3:
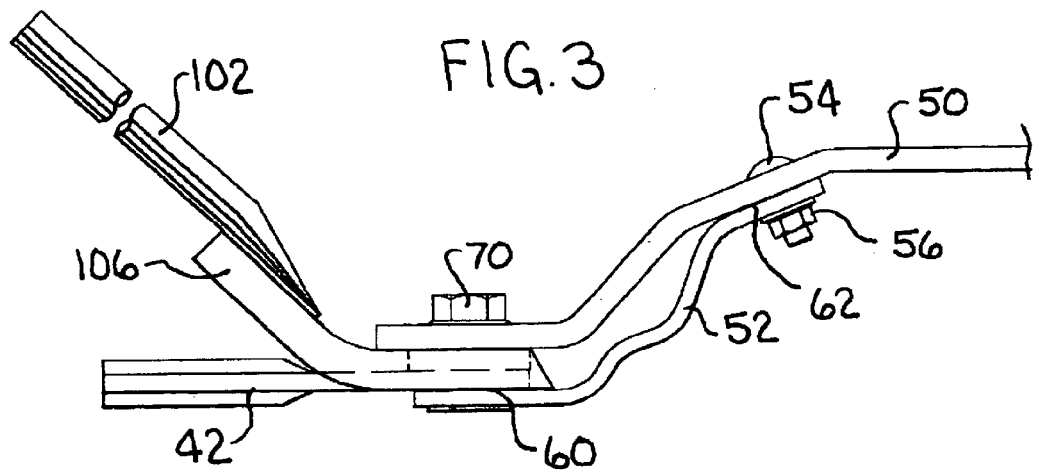
FIG. 3 is an enlarged side elevational view of the important components of the knife mounting system of FIG. 2, also showing a portion of the special tool partially inserted for removal of the knife.
Figure 5:
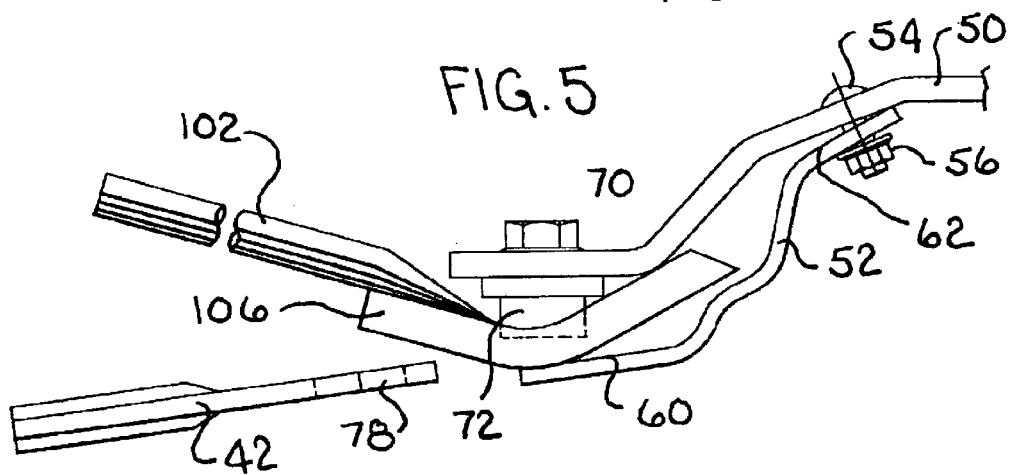
FIG. 5 is another side elevational view, similar to FIG. 3, showing the tool substantially fully inserted and the blade either being removed or replaced.

Referring now to FIGS. 2, 3 and 5, the mounting system of the instant invention will be described. A spring plate 52 is affixed to cover 50 by retaining bolt 54 and held in place by a nut 56 on the bottom thereof. Bolt 54 is preferably a carriage-type bolt with a square collar section to match the square hold 58 in the cover. This arrangement does not require a slot in the head of the bolt, that might catch debris and cause an unwanted buildup of materials, and permits tightening and loosening from the bottom. While only one carriage bolt is described herein, it is more appropriate to have at least two such bolts, as shown in FIG. 2. Spring plate 52, made of a spring steel, two important surfaces 60 and 62 (see FIGS. 3 and 5) at opposing ends of the spring plate. The intervening portion, shown generally as 64 in FIG. 2, of the spring plate contains bends that provide the required compressive forces, as will be discussed further below.

A knife bolt 70 extends through cover 50 into a cylindrical replaceable knife pin 72 and fixes the knife pin relative to the cover. Knife pin 72 has a threaded hex or square nut 74 affixed to the top thereof which fits a similarly shaped hole 76 in cover 50. Knife 42 has a hole 78 therethrough, slightly larger in diameter than that of knife pin 72, so that the knife may readily rotate about the pin. A hole 80 extends through spring plate 60 at surface 60 thereof. Hole 80 is slot-shaped with the shortest dimension slightly larger than the diameter of knife pin 72.

As assembled, the knife holding mechanism includes the cover 50 with the knife pin affixed in the position shown. The spring plate 52 is tightly affixed to the cover by bolt 54 and nut 56 so that the surface 62 fits tightly against the underside of cover 50. The knife 42 is fitted onto pin 72 which also extends through hole 80. The spring plate 52, because of its shape, i.e., the relative locations of surfaces 60 and 62 and the number and sizes of the bends in the spring plate, presses the knife 42 to the underside of cover 50. Knife pin 72 keeps the components in line and provides an axis about which knife 42 may rotate. The knife 42 can be easily and quickly removed and replaced by overcoming the compression of spring plate 52 sufficiently to permit the knife to be taken off of knife pin 72.

Figure 4:
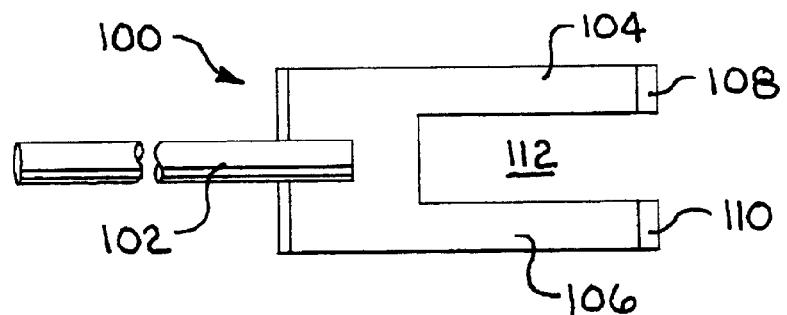
FIG. 4 is a partial top elevational view of the special tool.

To overcome the compression of spring plate 52 the tool shown in FIGS. 3–5 is quite convenient. In FIG. 4 the tool 100 is shown to include a handle portion 102 and a pair of identical bent (as shown in FIGS. 3 and 5) forked extensions 104, 106. The exterior end of each extension is slant-cut to create a slight ramp 108, 110 on each. The opening 112 between extensions 104 and 106 is wider than the diameter of knife pin 72 and the knife 42, and long enough to allow the ends of the extensions to extend past knife pin 72 to contact the underside of cover 50.

In operation, the forked extensions of the tool are inserted along side of the knife 42 until the extension ends 108, 110 dear the knife pin sufficiently to engage the underside of the cover 50. By pushing downwardly on the handle 102, the compression of spring plate 52 is overcome, such that continued downward movement frees the knife 42 from knife pin 72.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A disc cutterhead for a rotary mower, said cutterhead comprising:

a low-profile generally bowl-shaped generally symmetrical cover with an upper generally convex side, an opposing generally concave underside and a peripheral edge;

a plurality of quick change knife attachment systems generally symmetrically located around said peripheral edge, each said knife attachment system including:

an elongate spring plate having a longitudinal axis and a transverse axis perpendicular to said longitudinal axis, a first end portion and an opposing second end portion with a middle portion therebetween, all three portions aligned along said longitudinal axis, and said middle portion having a curvilinear longitudinal side profile with bends therein, said first end portion rigidly affixed to said concave underside of said cover;

a cylindrical knife pin affixed to said concave underside of said cover adjacent said peripheral edge and depending therefrom;

an elongate knife with a first end and an opposing second end, said first end including a cutting edge and said second end having a hole therethrough with a diameter slightly larger than the diameter of said cylindrical knife pin;

said second end portion of said spring plate having a hole therethrough with a diameter slightly larger than the diameter of said cylindrical knife pin;

said bends in said middle portion of said spring plate being such that, with said hole in said knife fitted onto said knife pin and said knife pin extending into and through said hole in said second end portion of said spring plate, said second end portion of said spring plate is biased toward said underside of said cover, whereby said knife is held in operating position.

2. The cutterhead of claim 1, wherein:

said cover has a central vertical axis of rotation with a radial vertical planes extending from said axis of rotation outwardly to each of said knife pins.

3. The cutterhead of claim 2, wherein:

said longitudinal axis of said spring plate of each attachment system is generally aligned with the respective said radial vertical plane.

4. The cutterhead of claim 3, wherein:

said spring plate is comprised of spring steel.

5. The cutterhead of claim 4, wherein:

said plurality of quick change knife attachment systems comprises two such systems.

6. In a disc cutterhead for a rotary mower, said cutterhead comprising a generally symmetrical cover with an upper generally convex side, an opposing generally concave underside and a peripheral edge, a plurality of knife attachment systems generally symmetrically located around said peripheral edge, the improvement wherein:

each said knife attachment system includes:
    an elongate spring plate having a longitudinal axis and a transverse axis perpendicular to said longitudinal axis, a first end portion and an opposing second end portion with a middle portion therebetween, all three portions aligned along said longitudinal axis, and said middle portion having a curvilinear longitudinal side profile with bends therein, said first end portion rigidly affixed to said concave underside of said cover;
    a cylindrical knife pin affixed to said concave underside of said cover adjacent said peripheral edge and depending therefrom;
    an elongate knife with a first end and an opposing second end, said first end including a cutting edge and said second end having a hole therethrough with a diameter slightly larger than the diameter of said cylindrical knife pin;
    said second end portion of said spring plate having a hole therethrough with a diameter slightly larger than the diameter of said cylindrical knife pin;
    said bends in said middle portion of said spring plate being such that, with said hole in said knife fitted onto said knife pin and said knife pin extending into and through said hole in said second end portion of said spring plate, said second end portion of said spring plate is biased toward said underside of said cover, whereby said knife is held in operating position.

7. The improvement of claim 6, wherein:

said cover has a central vertical axis of rotation with a radial vertical planes extending from said axis of rotation outwardly to each of said knife pins.

8. The cutterhead of claim 7, wherein:

said longitudinal axis of said spring plate of each attachment system is generally aligned with the respective said radial vertical plane.

9. The cutterhead of claim 8, wherein:

said spring plate is comprised of spring steel.

10. The cutterhead of claim 4, wherein:

said plurality of quick change knife attachment systems comprises two such systems.

11. A rotary mower comprising:

a disc cutterbar made up of a plurality of cutterheads arranged in a row on an elongated support member;

an enclosed drive mechanism affixed to said support member and driving each of said plurality of cutterheads, each cutterhead comprising:

generally symmetrical cover with an upper generally convex side, an opposing generally concave underside and a peripheral edge, a plurality of knife attachment systems generally symmetrically located around said peripheral edge, the improvement wherein:

each said knife attachment system includes:
    an elongate spring plate having a longitudinal axis and a transverse axis perpendicular to said longitudinal axis, a first end portion and an opposing second end portion with a middle portion therebetween, all three portions aligned along said longitudinal axis, and said middle portion having a curvilinear longitudinal side profile with bends therein, said first end portion rigidly affixed to said concave underside of said cover;
    a cylindrical knife pin affixed to said concave underside of said cover adjacent said peripheral edge and depending therefrom;
    an elongate knife with a first end and an opposing second end, said first end including a cutting edge and said second end having a hole therethrough with a diameter slightly larger than the diameter of said cylindrical knife pin;
    said second end portion of said spring plate having a hole therethrough with a diameter slightly larger than the diameter of said cylindrical knife pin;

said bends in said middle portion of said spring plate being such that, with said hole in said knife fitted onto said knife pin and said knife pin extending into and through said hole in said second end portion of said spring plate, said second end portion of said spring plate is biased toward said underside of said cover, whereby said knife is held in operating position.

12. The rotary mower of claim 11, wherein:

said cover has a central vertical axis of rotation with a radial vertical planes extending from said axis of rotation outwardly to each of said knife pins.

13. The cutterhead of claim 12, wherein:

said longitudinal axis of said spring plate of each attachment system is generally aligned with the respective said radial vertical plane.

14. The cutterhead of claim 13, wherein:

said spring plate is comprised of spring steel.

15. The cutterhead of claim 14, wherein:

said plurality of quick change knife attachment systems comprises two such systems.

* * * * *